(12) United States Patent
Zhang et al.

(10) Patent No.: US 10,325,498 B2
(45) Date of Patent: Jun. 18, 2019

(54) VEHICLE COMMUNICATION THROUGH DEDICATED CHANNEL

(71) Applicant: Harman International Industries, Incorporated, Stamford, CT (US)

(72) Inventors: Guoxia Zhang, Shanghai (CN); Qingshan Zhang, Shanghai (CN); Zeng Yang, Shanghai (CN)

(73) Assignee: Hartman International Industries, Incorporated, Stamford, CT (US)

( * ) Notice: Subject to any disclaimer, the term of this patent is extended or adjusted under 35 U.S.C. 154(b) by 76 days.

(21) Appl. No.: 15/315,356

(22) PCT Filed: Jun. 24, 2014

(86) PCT No.: PCT/CN2014/080607
§ 371 (c)(1),
(2) Date: Nov. 30, 2016

(87) PCT Pub. No.: WO2015/196359
PCT Pub. Date: Dec. 30, 2015

(65) Prior Publication Data
US 2018/0182244 A1    Jun. 28, 2018

(51) Int. Cl.
*G08G 1/16* (2006.01)
*G06K 9/00* (2006.01)
(Continued)

(52) U.S. Cl.
CPC ......... *G08G 1/163* (2013.01); *G06K 9/00798* (2013.01); *G08G 1/091* (2013.01);
(Continued)

(58) Field of Classification Search
CPC ........... B60K 2350/2052; G01S 13/723; G01S 13/86; G01S 13/867; G01S 13/87;
(Continued)

(56) References Cited

U.S. PATENT DOCUMENTS 6,405,132 B1   6/2002 Breed et al.
9,711,051 B2 * 7/2017 Segarra ............. G08G 1/09626
(Continued)

FOREIGN PATENT DOCUMENTS

CN   101251927 A    8/2008
CN   102831780 A   12/2012
(Continued)

OTHER PUBLICATIONS

ISA State Intellectual Property Office of the People's Republic of China, International Search Report and Written Opinion Issued in Application No. PCT/CN2014/080607, dated Mar. 27, 2015, WIPO, 14 pages.
(Continued)

*Primary Examiner* — Daniel Previl
(74) *Attorney, Agent, or Firm* — McCoy Russell LLP

(57) ABSTRACT

Methods for broadcasting or receiving information through a channel which is dedicated for vehicular safety use are provided. And electronic devices are provided. One of the methods includes: an electronic device mounted on a vehicle obtaining lane information of the vehicle, where the lane information indicates on which lane the vehicle is travelling; and broadcasting the lane information of the vehicle through a channel which is dedicated for vehicular safety use. By employing the methods, electronic devices can broadcast their lane information, road information or layer information through a channel which is dedicated for vehicular safety use, which may meet requirements in some vehicular safety applications.

15 Claims, 8 Drawing Sheets

(51) Int. Cl.
  *H04L 29/08* (2006.01)
  *H04W 4/46* (2018.01)
  *G08G 1/09* (2006.01)
(52) U.S. Cl.
  CPC ............ *G08G 1/166* (2013.01); *G08G 1/167* (2013.01); *H04L 29/08* (2013.01); *H04L 67/12* (2013.01); *H04W 4/46* (2018.02)
(58) Field of Classification Search
  CPC ................ G01S 13/931; G01S 17/023; G01S 2013/9321; G01S 2013/9325; G01S 2013/9342; G01S 2013/9346; G01S 2013/935; G01S 2013/9353
  USPC .......... 340/902, 903, 539.13, 988, 933, 438, 340/905, 995.13, 934, 937–939, 918–919, 340/532
  See application file for complete search history.

(56) References Cited

U.S. PATENT DOCUMENTS

| | | | | |
|---|---|---|---|---|
| 2002/0082767 | A1* | 6/2002 | Mintz | G08G 1/01 701/117 |
| 2005/0088318 | A1* | 4/2005 | Liu | G08G 1/0965 340/902 |
| 2007/0290839 | A1* | 12/2007 | Uyeki | G01C 21/3415 340/539.13 |
| 2009/0115638 | A1* | 5/2009 | Shankwitz | G01C 21/26 340/988 |
| 2012/0095674 | A1* | 4/2012 | Lee | G01C 21/3658 701/423 |
| 2012/0283942 | A1* | 11/2012 | T'Siobbel | G01C 21/26 701/410 |
| 2013/0132434 | A1* | 5/2013 | Scofield | G08G 1/0112 707/771 |
| 2013/0293394 | A1* | 11/2013 | Rubin | G08G 9/02 340/902 |

FOREIGN PATENT DOCUMENTS

| | | |
|---|---|---|
| CN | 103065501 A | 4/2013 |
| CN | 103261840 A | 8/2013 |
| CN | 103810904 A | 5/2014 |
| WO | 2013113904 A1 | 8/2013 |

OTHER PUBLICATIONS

European Patent Office, Extended European Search Report Issued in Application No. 14895929.9, dated Jan. 30, 2018, Germany, 9 pages.

State Intellectual Property Office of the People's Republic of China, Office Action and Search Report Issued in Application No. 201480079190.9, dated Jan. 28, 2019, 20 pages. (Submitted with Partial Translation).

\* cited by examiner

ASN.1 Representation:

TemporaryID ::= OCTET STRING (SIZE(16)) -- a 16 or another byte string array

XML Representation:

```
<xs:complexType
name="RoadID" >
  <xs:simpleContent>
    <xs:annotation>
      <xs:documentation>
        a 8 byte string array
      </xs:documentation>
    </xs:annotation>
  </xs:simpleContent>
</xs:complexType>
```

VEHICLE COMMUNICATION THROUGH DEDICATED CHANNEL

CROSS REFERENCE TO RELATED APPLICATIONS

The present application is a U.S. National Phase of International Patent Application Serial No. PCT/CN2014/080607, entitled "VEHICLE COMMUNICATION THROUGH DEDICATED CHANNEL" filed on Jun. 24, 2014, the entire contents of which are hereby incorporated by reference for all purposes.

TECHNICAL FIELD

The present disclosure generally relates to vehicle communication through a dedicated channel.

BACKGROUND

Currently, some vehicles may broadcast their position information, normally Global Positioning System (GPS) data, periodically when travelling on a road to avoid collisions and/or improve traffic flow. However, merely broadcasting GPS data may not be adequate for implementing some safety applications, such as Intersection Movement Assist (IMA) or Forward Collision Warning (FCW) because of the low accuracy of GPS data.

SUMMARY

In one embodiment, a method for broadcasting information through a channel which is dedicated for vehicular safety use is provided. The method includes: an electronic device mounted on a vehicle obtaining lane information of the vehicle, where the lane information indicates on which lane the vehicle is travelling; and broadcasting the lane information of the vehicle through the channel.

In some embodiments, the method may further include: obtaining an image captured by a camera mounted on the vehicle; and obtaining the lane information of the vehicle from the image based on image processing technologies.

In some embodiments, the channel may be allocated based on particular standards or policies which vary from different areas. For example, in America, the channel may be allocated by Federal Communications Commission (FCC), where radio frequency band in a 5.9 GHz band is used. In European Union, the channel may be allocated by European Telecommunications Standards Institute (ETSI), where radio frequency band in a 5.9 GHz band is used. In Japanese, the channel may be allocated by Ministry of Internal Affairs and Communications (MIC), where radio frequency in a 5.8 GHz band or in a 700 MHz band is used.

In some embodiments, the method may further include: broadcasting road information of the vehicle through the channel, where the road information indicates on which road the vehicle is travelling.

In some embodiments, the method may further include: broadcasting layer information of the vehicle through the channel, where the layer information indicates on which layer of a viaduct the vehicle is travelling.

In some embodiments, the lane information of the vehicle may be broadcasted periodically. In some embodiments, the lane information is incorporated in a vehicle safety message which is updated and broadcasted in the channel periodically.

In some embodiments, the lane information of the vehicle may be broadcasted when the lane information of the vehicle changes.

In one embodiment, a method for broadcasting information through a channel which is dedicated for vehicular safety use is provided. The method includes: obtaining lane information of an electronic device, where the lane information indicates on which lane the electronic device is travelling; and broadcasting the lane information of the electronic device through the channel.

In one embodiment, a method for broadcasting information through a channel which is dedicated for vehicular safety use is provided. The method includes: an electronic device mounted on a vehicle obtaining road information of the vehicle, where the road information indicates on which road the vehicle is travelling; and broadcasting the road information of the vehicle through the channel.

In some embodiments, obtaining road information of the vehicle may include: obtaining position information and heading information of the vehicle; and combining the position information and heading information with a map to obtain the road information of the vehicle.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the method may further include: broadcasting lane information of the vehicle through the channel, where the lane information indicates on which lane the vehicle is travelling.

In some embodiments, the method may further include: broadcasting layer information of the vehicle through the channel, where the layer information indicates on which layer of a viaduct the vehicle is travelling.

In some embodiments, the road information of the vehicle may be broadcasted periodically. In some embodiments, the road information is incorporated in a vehicle safety message which is updated and broadcasted in the channel periodically.

In some embodiments, the road information of the vehicle may be broadcasted when the road information of the vehicle changes.

In one embodiment, a method for broadcasting information through a channel which is dedicated for vehicular safety use is provided. The method includes: obtaining road information of an electronic device, where the road information indicates on which road the electronic device is travelling; and broadcasting the road information of the electronic device through the channel.

In one embodiment, a method for broadcasting information through a channel which is dedicated for vehicular safety use is provided. The method includes: an electronic device mounted on a vehicle obtaining layer information of the vehicle, where the layer information indicates on which layer of a viaduct the vehicle is travelling; and broadcasting the layer information of the vehicle through the channel.

In some embodiments, the layer information of the vehicle may be obtained based on information of the vehicle obtained from sensors mounted on the vehicle, such as GPS data, acceleration, torsion and etc.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the method may further include: broadcasting lane information of the vehicle through the channel, where the lane information indicates on which lane the vehicle is travelling.

In some embodiments, the method may further include: broadcasting road information of the vehicle through the channel, where the road information indicates on which road the vehicle is travelling.

In some embodiments, the layer information of the vehicle may be broadcasted periodically. In some embodiments, the layer information is incorporated in a vehicle safety message which is updated and broadcasted in the channel periodically.

In one embodiment, a method for broadcasting information through a channel which is dedicated for vehicular safety use is provided. The method includes: obtaining layer information of an electronic device, where the layer information indicates on which layer of a viaduct the electronic device is travelling; and broadcasting the layer information of the electronic device through the channel.

In one embodiment, a method for determining whether a collision will happen is provided. The method includes: a system mounted on a first vehicle receiving on a channel, which is dedicated for vehicular safety use, a message which is broadcasted periodically by a second vehicle; extracting from the received message lane information which indicates on which lane the second vehicle is travelling; and determining whether there is risk that the first and the second vehicles will hit each other based on the extracted lane information.

In some embodiments, the message may be defined in a particular standard. For example, in America, the message may be defined in the Society of Automotive Engineer (SAE) J2735 standard, such as a Basic Safety Message (BSM). In European Union, the message may be defined in the ETSI TS 102 637 standard, such as a Cooperative Awareness Message (CAM). In Japanese, the message may be defined in the Association of Radio Industries and Businesses (ARIB) standard.

In some embodiments, the method may further include: extracting from the received message road information which indicates on which road the second vehicle is travelling; and determining whether there is risk that the first and the second vehicles will hit each other based on the extracted road and lane information.

In some embodiments, the method may further include: extracting from the received message layer information which indicates on which layer of a viaduct the second vehicle is travelling; and determining whether there is risk that the first and the second vehicles will hit each other based on the extracted layer and lane information.

In one embodiment, a method for receiving information through a channel which is dedicated for vehicular safety use is provided. The method includes: receiving a message which contains lane information of a vehicle through the channel, where the lane information of the vehicle indicates on which lane the vehicle is travelling; and extracting the lane information of the vehicle from the message.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the message may further contain road information of the vehicle which indicates on which road the vehicle is travelling. And the method may further include extracting the road information of the vehicle from the message.

In some embodiments, the message may further contain layer information of the vehicle which indicates on which layer of a viaduct the vehicle is travelling. And the method may further include extracting the layer information of the vehicle from the message.

In one embodiment, a method for receiving information through a channel which is dedicated for vehicular safety use is provided. The method includes: receiving a message which contains lane information of an electronic device through the channel, where the lane information of the electronic device indicates on which lane the electronic device is travelling; and extracting the lane information of the electronic device from the message.

In one embodiment, a method for receiving information through a channel which is dedicated for vehicular safety use is provided. The method includes: receiving a message which contains road information of a vehicle through the channel, where the road information of the vehicle indicates on which road the vehicle is travelling; and extracting the road information of the vehicle from the message.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In one embodiment, a method for receiving information through a channel which is dedicated for vehicular safety use is provided. The method includes: receiving a message which contains road information of an electronic device through the channel, where the road information of the electronic device indicates on which road the electronic device is travelling; and extracting the road information of the electronic device from the message.

In one embodiment, a method for receiving information through a channel which is dedicated for vehicular safety use is provided. The method includes: receiving a message which contains layer information of a vehicle through the channel, where the layer information of the vehicle indicates on which layer of a viaduct the vehicle is travelling; and extracting the layer information of the vehicle from the message.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In one embodiment, a method for receiving information through a channel which is dedicated for vehicular safety use is provided. The method includes: receiving a message which contains layer information of an electronic device through the channel, where the layer information of the electronic device indicates on which layer of a viaduct the electronic device is travelling; and extracting the layer information of the electronic device from the message.

In one embodiment, an electronic device mounted on a vehicle is provided. The electronic device may include a transmitter and a processing device configured to: obtain lane information of the vehicle, where the lane information indicates on which lane the vehicle is travelling; and control the transmitter to broadcast the lane information of the vehicle through a channel which is dedicated for vehicular safety use.

In some embodiments, the processing device may be further configured to obtain an image captured by a camera mounted on the vehicle; and obtain the lane information of the vehicle from the image based on image processing technologies.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the processing device may be further configured to: broadcast road information of the vehicle through the channel, where the road information indicates on which road the vehicle is travelling.

In some embodiments, the processing device may be further configured to: broadcast layer information of the vehicle through the channel, where the layer information indicates on which layer of a viaduct the vehicle is travelling.

In some embodiments, the processing device may be configured to control the transmitter to broadcast the lane information of the vehicle periodically.

In some embodiments, the processing device may be configured to incorporate the lane information of the vehicle in a vehicle safety message which is updated and broadcasted in the channel periodically.

In some embodiments, the processing device may be configured to control the transmitter to broadcast the lane information of the vehicle when the lane information of the vehicle changes.

In one embodiment, an electronic device is provided. The electronic device may include a transmitter and a processing device configured to: obtain lane information of the electronic device, where the lane information indicates on which lane the electronic device is travelling; and control the transmitter to broadcast the lane information of the electronic device through a channel which is dedicated for vehicular safety use.

In one embodiment, an electronic device mounted on a vehicle is provided. The electronic device may include a transmitter and a processing device configured to: obtain road information of the vehicle, where the road information indicates on which road the vehicle is travelling; and control the transmitter to broadcast the road information of the vehicle through a channel which is dedicated for vehicular safety use.

In some embodiments, the processing device may be configured to: obtain position information and heading information of the vehicle; and combine the position information and heading information of the vehicle with a map to obtain the road information of the vehicle.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the processing device may be further configured to: broadcast lane information of the vehicle through the channel, where the lane information indicates on which lane the vehicle is travelling.

In some embodiments, the processing device may be further configured to: broadcast layer information of the vehicle through the channel, where the layer information indicates on which layer of a viaduct the vehicle is travelling.

In some embodiments, the processing device may be configured to control the transmitter to broadcast the road information of the vehicle periodically.

In some embodiments, the processing device may be configured to incorporate the road information of the vehicle in a vehicle safety message which is updated and broadcasted in the channel periodically.

In some embodiments, the processing device may be configured to control the transmitter to broadcast the road information of the vehicle when the road information of the vehicle changes.

In one embodiment, an electronic device is provided. The electronic device may include a transmitter and a processing device configured to: obtain road information of the electronic device, where the road information indicates on which road the electronic device is travelling; and control the transmitter to broadcast the road information of the electronic device through a channel which is dedicated for vehicular safety use.

In one embodiment, an electronic device mounted on a vehicle is provided. The electronic device may include a transmitter and a processing device configured to: obtain layer information of the vehicle, where the layer information indicates on which layer of a viaduct the vehicle is travelling; and control the transmitter to broadcast the layer information of the vehicle through a channel which is dedicated for vehicular safety use.

In some embodiments, the processing device may be configured to obtain the layer information of the vehicle based on information of the vehicle obtained from sensors mounted on the vehicle, such as GPS data, acceleration, torsion and etc.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the processing device may be further configured to: broadcast lane information of the vehicle through the channel, where the lane information indicates on which lane the vehicle is travelling.

In some embodiments, the processing device may be further configured to: broadcast road information of the vehicle through the channel, where the road information indicates on which road the vehicle is travelling.

In some embodiments, the processing device may be configured to control the transmitter to broadcast the road information of the vehicle periodically.

In some embodiments, the processing device may be configured to incorporate the lane information of the vehicle in a vehicle safety message which is updated and broadcasted in the channel periodically.

In one embodiment, an electronic device is provided. The electronic device may include a transmitter and a processing device configured to: obtain layer information of the electronic device, where the layer information indicates on which layer of a viaduct the electronic device is travelling; and control the transmitter to broadcast the layer information of the electronic device through a channel which is dedicated for vehicular safety use.

In one embodiment, an electronic device mounted on a first vehicle is provided. The electronic device may include a receiver and a processing device configured to: after a message which is broadcasted periodically by a second vehicle is received on a channel, which is dedicated for vehicular safety use, by the receiver, extract from the received message lane information which indicates on which lane the second vehicle is travelling; and determine whether there is risk that the first and the second vehicles will hit each other based on the extracted lane information.

In some embodiments, the message may be defined in a particular standard. For example, in America, the message may be defined in the SAE J2735 standard, such as a BSM. In European Union, the message may be defined in the ETSI TS 102 637 standard. In some embodiments, the message may be a CAM. In Japanese, the message may be defined in the ARIB standard.

In some embodiments, the processing device may be further configured to: extract from the received message road information which indicates on which road the second vehicle is travelling; and determine whether there is risk that the first and the second vehicles will hit each other based on the extracted road and lane information.

In some embodiments, the processing device may be further configured to: extract from the received message layer information which indicates on which layer of a viaduct the second vehicle is travelling; and determine whether there is risk that the first and the second vehicles will hit each other based on the extracted layer and lane information.

In one embodiment, an electronic device is provided. The electronic device may include a receiver and a processing device configured to: after a message containing lane information of a vehicle is received by the receiver through a channel which is dedicated for vehicular safety use, extract the lane information of the vehicle from the message, where the lane information of the vehicle indicates on which lane the vehicle is travelling.

In some embodiments, the electronic device may be mounted on a vehicle or a pedestrian device.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the message may further contain road information of the vehicle which indicates on which road the vehicle is travelling. And the processing device may be further configured to extract the road information of the vehicle from the message.

In some embodiments, the message may further contain layer information of the vehicle which indicates on which layer of a viaduct the vehicle is travelling. And the processing device may be further configured to extract the layer information of the vehicle from the message.

In one embodiment, a first electronic device is provided. The first electronic device may include a receiver and a processing device configured to: after a message containing lane information of a second electronic device is received by the receiver through a channel which is dedicated for vehicular safety use, extract the lane information of the second electronic device from the message, where the lane information of the second electronic device indicates on which lane the second electronic device is travelling.

In one embodiment, an electronic device is provided. The electronic device may include a receiver and a processing device configured to: after a message containing road information of a vehicle is received by the receiver through a channel which is dedicated for vehicular safety use, extract the road information of the vehicle from the message, where the road information of the vehicle indicates on which road the vehicle is travelling.

In some embodiments, the electronic device may be mounted on a vehicle or a pedestrian device.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In one embodiment, a first electronic device is provided. The first electronic device may include a receiver and a processing device configured to: after a message containing road information of a second electronic device is received by the receiver through a channel which is dedicated for vehicular safety use, extract the road information of the second electronic device from the message, where the road information of the second electronic device indicates on which road the second electronic device is travelling.

In one embodiment, an electronic device is provided. The electronic device may include a receiver and a processing device configured to: after a message 1 containing layer information of a vehicle is received by the receiver through a channel which is dedicated for vehicular safety use, extract the layer information of the vehicle from the message, where the layer information of the vehicle indicates on which layer of a viaduct the vehicle is travelling.

In some embodiments, the electronic device may be mounted on a vehicle or a pedestrian device.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In one embodiment, a first electronic device is provided. The first electronic device may include a receiver and a processing device configured to: after a message containing layer information of a second electronic device is received by the receiver through a channel which is dedicated for vehicular safety use, extract the layer information of the second electronic device from the message, where the layer information of the second electronic device indicates on which layer of a viaduct the second electronic device is travelling.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
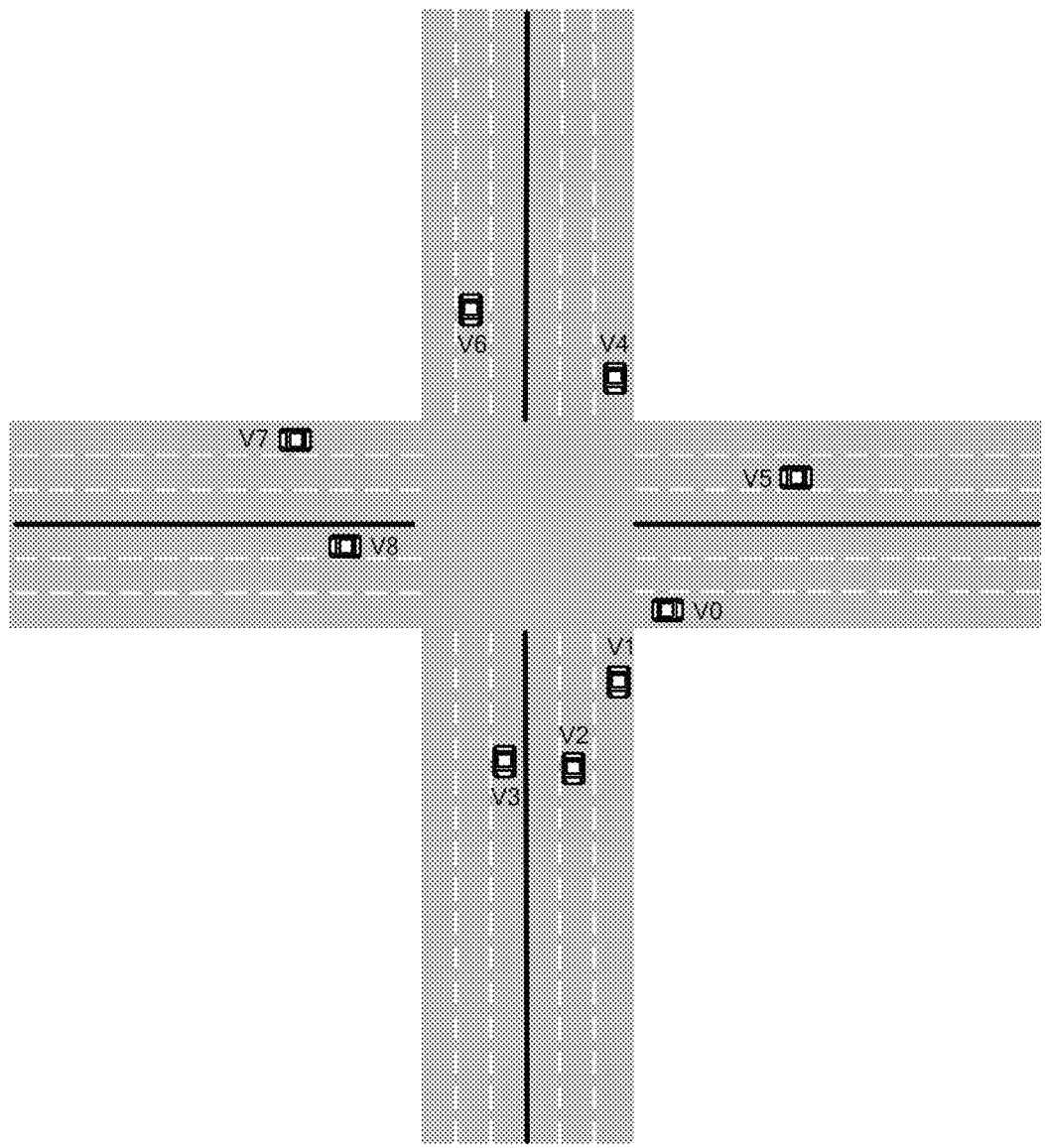
FIG. 1 illustrates an example diagram of a driving scenario.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In some safety applications, such as Blind Spot Warning or Lane Change Warning, lane information of vehicles (i.e., on which lanes the vehicles are travelling) is important. In some safety applications, such as Intersection Movement Assist or Control Loss Warning, road information of vehicles (i.e., on which roads the vehicles are travelling) is important. However, in existing solutions, vehicles merely broadcast their position information, such as geographical coordinates obtained from a GPS device, when travelling on a road. Accurate lane information can be obtained based on position information within 1.5-meter accuracy, and accurate road information can be obtained based on position information within 5-meter accuracy. However, the position information obtained from existing GPS devices is generally within 10-meter accuracy, which may not result in accurate lane and road information.

In some embodiments, methods for broadcasting road information or lane information of vehicles through a channel which is dedicated for vehicular safety use are provided. Besides, on a multi-layer viaduct, layer information of vehicles (i.e., on which layer of a viaduct the vehicles are travelling) may be broadcasted through a channel which is dedicated for vehicular safety use. In some embodiments, road information, lane information or layer information of electronic devices, such as a pedestrian device, may be broadcasted, which may also meet requirements in some safety applications.

FIG. 1 illustrates an example diagram of an intersection scenario, which is a typical scenario in reality.

Referring to FIG. 1, vehicles V0 to V8 are driving on the roads. Assuming each of the vehicles V0 to V8 is equipped with a wireless transmission and reception device, each vehicle may broadcast its messages and receive messages from other vehicles. In some embodiments, each of the vehicles V0 to V8 may be equipped with a positioning device, such as a GPS device, to obtain position information, heading information and etc. In some embodiments, a camera may be mounted on each vehicle. In some embodiments, each of the vehicles V0 to V8 may be equipped with a dead reckoning device to obtain vehicle data.

A common GPS device is typically able to achieve 10-meter accuracy. Geographical coordinates of the vehicle V1 obtained from a GPS device mounted thereon may not be the accurate position information of the vehicle V1. For example, the vehicle V1 may be positioned to the location of the vehicle V0. Further, which road the vehicle V1 is travelling on may be determined incorrectly. For another example, the distance between the vehicles V2 and V3 is relatively short and they may generate a sound alarm to mention users for driving safety. However, from FIG. 1, there is an isolation strip between the vehicles V2 and V3. Thus, although the vehicle V2 and V3 are close to each other, there is no need for them to generate a sound alarm. Therefore, to meet requirements in some safety applications, in some embodiments, a method for broadcasting road information through a channel which is dedicated for vehicular safety use may be provided.

Figure 2:
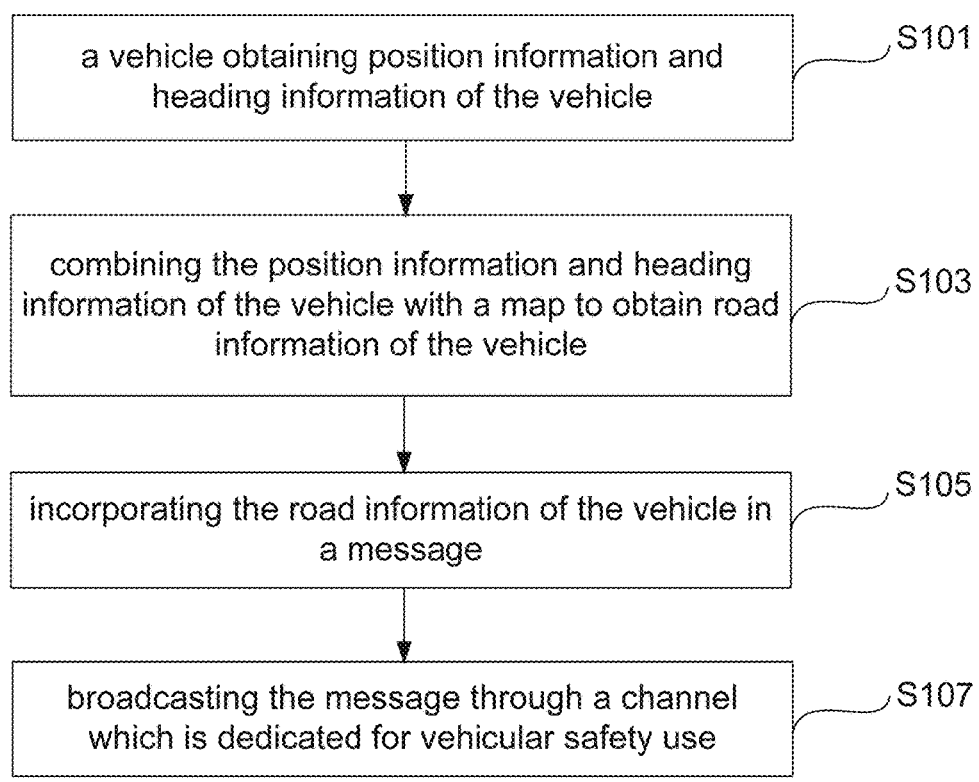
FIG. 2 illustrates a schematic flow chart of a method 100 for broadcasting road information through a channel which is dedicated for vehicular safety use according to some embodiments.

FIG. 2 illustrates a schematic flow chart of a method 100 for broadcasting road information through a channel which is dedicated for vehicular safety use according to some embodiments.

Referring to FIG. 2, in S101, a vehicle obtaining position information and heading information of the vehicle.

In some embodiments, the position and heading information may be obtained from a positioning device, such as a GPS device. In some embodiments, the position information may be represented by GPS coordinates.

In S103, the vehicle combining the position information and heading information of the vehicle with a map to obtain road information of the vehicle.

In some embodiments, the road information may indicate on which road the vehicle is travelling. Based on the position information and heading information of the vehicle and the map, a road which the vehicle is travelling on may be determined. In some embodiments, the road information of the vehicle may include a road name and the heading information of the vehicle.

Figures 3, 4:
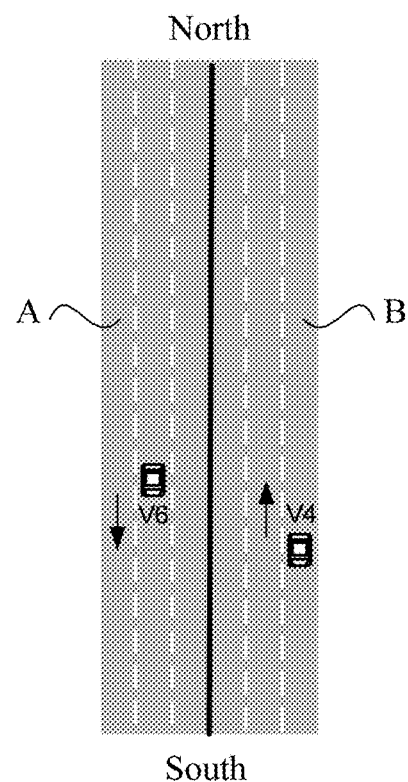
FIG. 3 illustrates an enlarged view of a branch of roads shown in FIG. 1.
FIG. 4 illustrates an example diagram of road information in ASN.1 representation.

Referring to FIG. 3, a branch of the roads shown in FIG. 1 is illustrated. The vehicles V4 and V6 are travelling on a same road, but the vehicle V4 is travelling towards north while the vehicle V6 is travelling towards south. Thus, they have different road information.

In some embodiments, the road information of the vehicle may be obtained from a dead reckoning device which can determine the road information based on historical data and information from related sensors mounted on the vehicle.

In S105, the vehicle incorporating the road information of the vehicle in a message.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

Figures 5, 6:
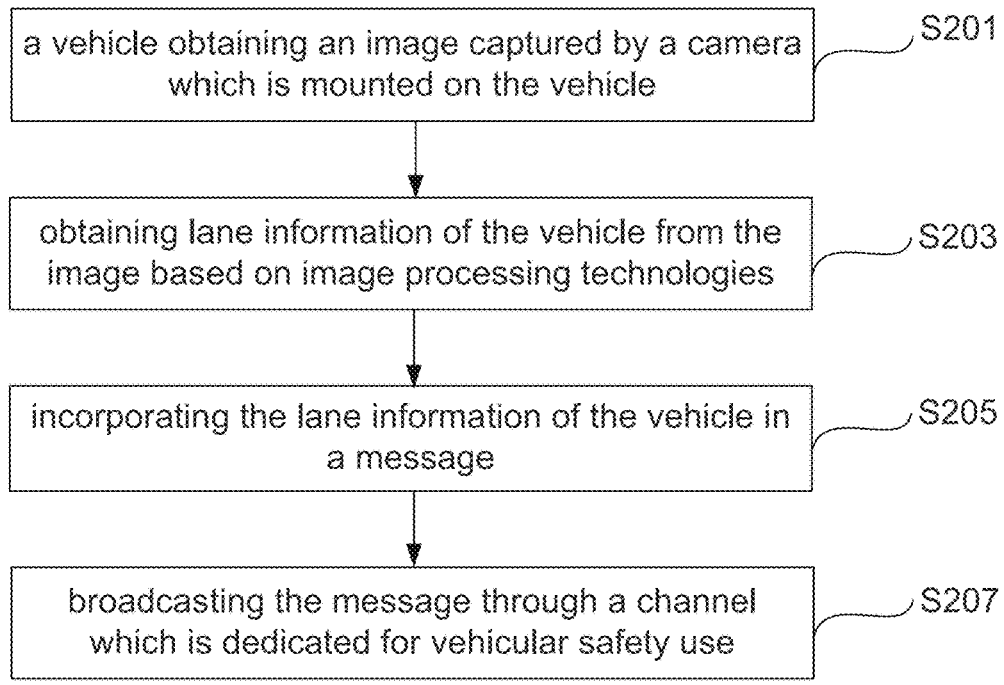
FIG. 5 illustrates an example diagram of road information in XML, representation.
FIG. 6 illustrates a schematic flow chart of a method 200 for broadcasting lane information through a channel which is dedicated for vehicular safety use according to some embodiments.

In some embodiments, the vehicle may generate a data structure to represent the message based on a syntax standard. In some embodiments, the syntax standard may be ASN.1 or XML. ASN.1 is a standard and notation that describes rules and structures for representing, encoding, transmitting, and decoding data in telecommunications and computer networking. XML is a markup language that defines a set of rules for encoding documents in a format that is both human-readable and machine-readable. Both ASN.1 and XML are well known in the art and not described in detail here. FIG. 4 illustrates an example diagram of road information in ASN.1 representation and FIG. 5 illustrates an example diagram of road information in XML representation.

In some embodiments, before generating the data structure, a data type of the road information and a format of the message are determined according to the syntax standard. In some embodiments, the data type may include integer, byte, string, array of bytes and etc.

In some embodiments, after the data structure for representing the message is generated, the vehicle may add the road information of the vehicle into the data structure. In some embodiments, different values may be used to represent different roads and added into the data structure.

In some embodiments, if a road has an isolation strip or line thereon, the two portions at two sides of the isolation strip or line may have different road identifier, that is, different values may be used to represent the two portions. In some embodiments, to a road located in a south-north direction, a portion of the road on which vehicles travel towards south may be represented by a first value while the other portion of the road on which vehicles travel towards north may be represented by a second value. In some embodiments, to a road located in an east-west direction, a portion of the road on which vehicles travel towards east may be represented by a third value while the other portion of the road on which vehicles travel towards west may be represented by a fourth value.

For example, referring to FIG. 3, the vehicles V4 and V6 are travelling on the same road and have different heading information. Thus, the portion A of the road on which the vehicle V4 is travelling and the portion B of the road on which the vehicle V4 is travelling are represented by different values, for example, 1 and 2, respectively.

In some embodiments, the vehicle may encode the data structure for representing the message to a data stream based on an encoding rule. In some embodiments, the encoding rule may be DER. The data structure may be encoded into a data stream consisting of data type, length and content. In some embodiments, the data stream may be over-the-air bits and bytes.

In this example, the message carrying the road information is a BSM. A BSM generally includes two parts, i.e., part I and part II. Part I contains core data elements, including an identifier of the BSM, vehicle position, heading, speed, acceleration, steering wheel angle, vehicle size and etc. Part II is used to carry data elements drawn from an extensive list of optional elements. In some embodiments, the road information may be carried in part II. During the encoding process, the identifier of the BSM, contents in part I except the identifier of the BSM, and contents in part II may be encoded respectively. Since there are too many roads in a country, in some embodiments, the length of the road information may be more than one byte, such as 16 bytes.

In S107, the vehicle broadcasting the message through a channel which is dedicated for vehicular safety use.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be broadcasted periodically. In some embodiments, the period may be 100 milliseconds. In some embodiments, the vehicle may travel on a same road in a time period, that is, the road information of the vehicle may not change in the time period, thus, the vehicle may not broadcast the message until the road information of the vehicle changes.

In some embodiments, a pedestrian device may broadcast its road information through a channel which is dedicated for vehicular safety use.

From above, combining positioning information and heading information with a map, an electronic device mounted on a vehicle or a pedestrian device can realize to broadcast its road information through a channel which is dedicated for vehicular safety use, which may meet requirements in some safety applications.

In some applications, lane information may be important. Referring to FIG. 1, the vehicles V1 and V2 are travelling on a same road. Assuming the vehicle V2 knows the vehicle V1 breaks down on the road, the vehicle V2 as close to the vehicle V1 may generate a sound alarm to mention a user. However, the vehicle V1 and V2 are on different lanes, thus, there is no need to generate a sound alarm. Therefore, in some embodiments, a method for broadcasting lane information through a channel which is dedicated for vehicular safety use may be provided.

FIG. 6 illustrates a schematic flow chart of a method 200 for broadcasting lane information through a channel which is dedicated for vehicular safety use according to some embodiments.

Referring to FIG. 6, in S201, a vehicle obtaining an image captured by a camera which is mounted on the vehicle.

In some embodiments, the camera may be mounted on the vehicle either facing or opposite to a driving direction of the vehicle.

In S203, obtaining lane information of the vehicle from the image based on image processing technologies.

In some embodiments, the lane information may indicate on which lane the vehicle is travelling.

In some embodiments, image pre-processing may be performed on the image to obtain a pre-processed image.

In some embodiments, road features may be extracted from the pre-processed image. In some embodiments, the road features may be extracted based on edge detection, frequency domain technologies or pavement texture.

In some embodiments, Hough transform may be performed on the image to realize lane mark detection. Based on the detected lane marks, the lane information of the vehicle may be obtained.

Figure 7:
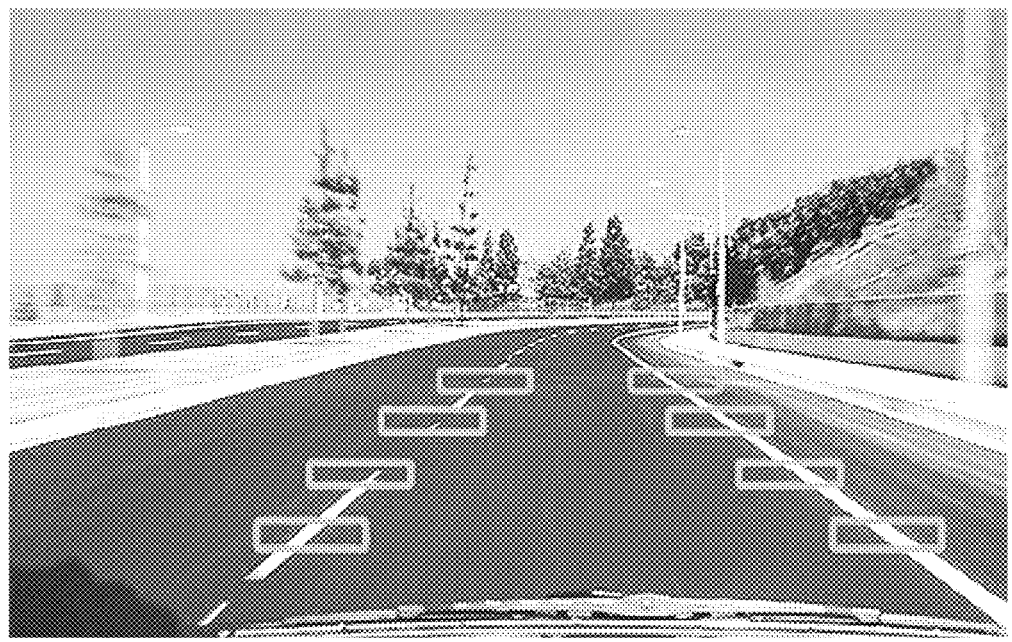
FIG. 7 illustrates an example image obtained by a camera mounted on a vehicle.

FIG. 7 illustrates an example image obtained by a camera mounted on a vehicle. The image includes several lane marks, which are marked with rectangular boxes. Based on related image processing technologies, the lane marks may be detected and further lane information of the vehicle may be obtained.

In S205, the vehicle incorporating the lane information of the vehicle in a message.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the vehicle may generate a data structure to represent the message based on a syntax standard. In some embodiments, the syntax standard may be ASN.1 or XML.

In some embodiments, after the data structure for representing the message is generated, the vehicle may add the lane information of the vehicle into the data structure.

In some embodiments, different values may be used to represent different lanes. For example, lanes on a road may be represented by 0, 1, 2 from right to left.

In some embodiments, the vehicle may encode the data structure for representing the message to a data stream based on an encoding rule.

In some embodiments, the encoding rule may be DER. The data structure may be encoded into a data stream consisting of data type, length and content. In some embodiments, the data stream may be over-the-air bits and bytes.

In some embodiments, the length of the lane information may be one byte.

In S207, the vehicle broadcasting the message through a channel which is dedicated for vehicular safety use.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the message may be broadcasted periodically. In some embodiments, the vehicle may travel on a same lane in a time period, that is, the lane information of the vehicle may not change in the time period, thus, the vehicle may not broadcast the message until the lane information of the vehicle changes.

In some embodiments, a pedestrian device may broadcast its lane information through a channel which is dedicated for vehicular safety use.

From above, an electronic device mounted on a vehicle or a pedestrian device can broadcast its lane information through a channel which is dedicated for vehicular safety use, which may meet requirements in some safety applications.

Figure 8:
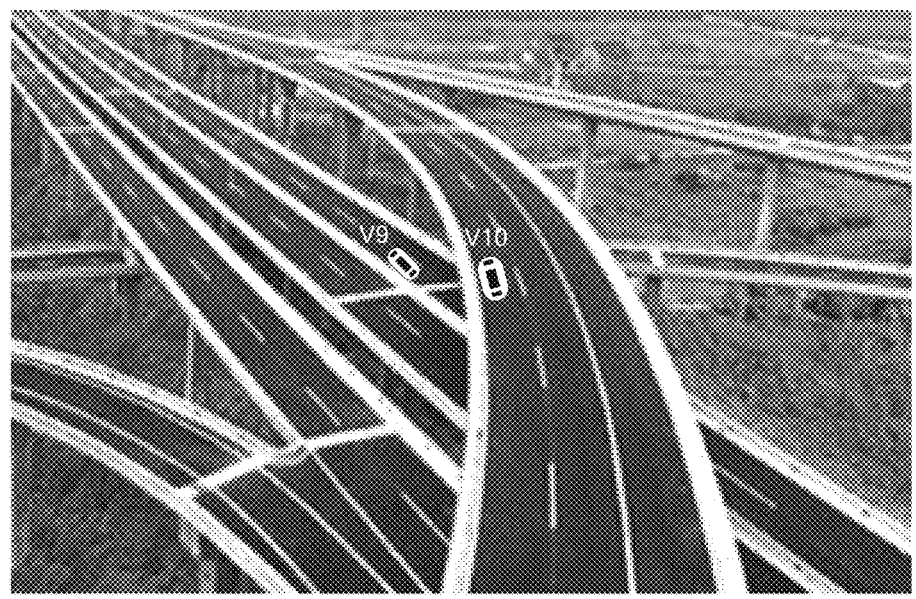
FIG. 8 illustrates an example diagram of a viaduct.

On a multi-layer viaduct, each layer may have a same road identifier. For example, referring to FIG. 8, roads on which vehicles V9 and V10 are travelling have a same road name, and even lanes on which they are travelling have a same lane identifier as well. Actually, the vehicles V9 and V10 are travelling on different layers of the viaduct, that is, they do not affect each other at all. Thus, it is necessary to identify different layers on the multi-layer viaduct.

Figure 9:
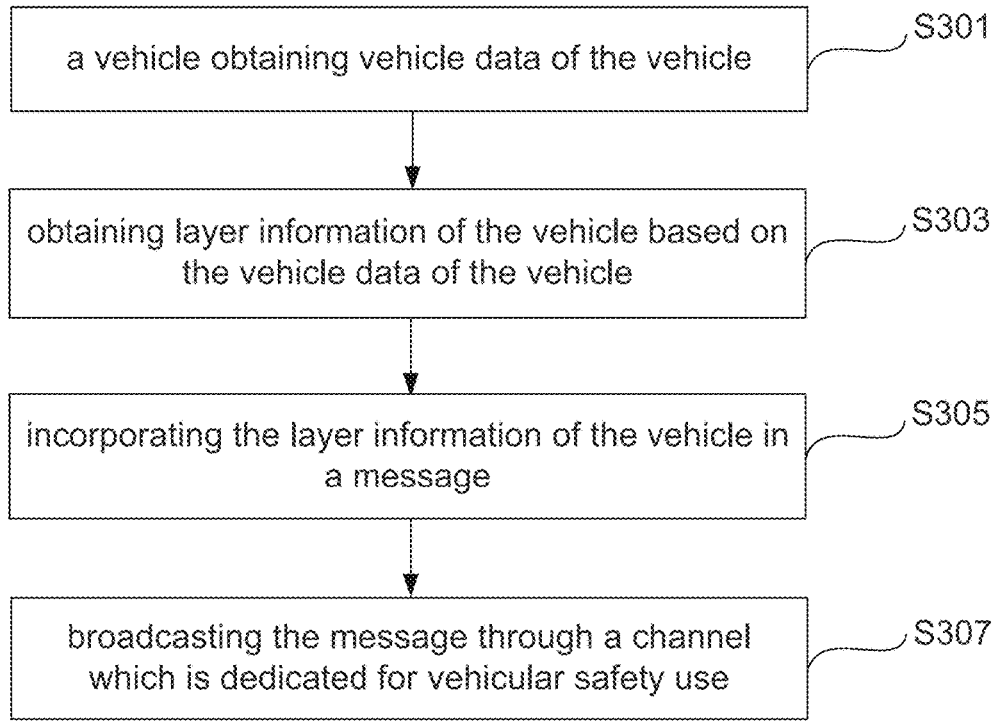
FIG. 9 illustrates a schematic flow chart of a method 300 for broadcasting layer information through a channel which is dedicated for vehicular safety use according to some embodiments.

FIG. 9 illustrates a schematic flow chart of a method 300 for broadcasting layer information through a channel which is dedicated for vehicular safety use according to some embodiments.

Referring to FIG. 9, in S301, a vehicle obtaining vehicle data of the vehicle.

In some embodiments, the vehicle data may be obtained from sensors mounted on the vehicle, such as a torque sensor, a wheel sensor, a sideslip sensor, a gyroscope or an acceleration transducer. In some embodiments, the vehicle data may include speed, acceleration, torque, orientation and so on.

In S303, the vehicle obtaining layer information of the vehicle based on the vehicle data of the vehicle.

In some embodiments, the layer information may indicate on which layer of a viaduct the vehicle is travelling. In some embodiments, on the basis of analyzing the vehicle data, the vehicle may obtain its layer information. For example, based on torque information of the vehicle, whether the vehicle is driving uphill or downhill may be determined. Combining the determination result with the time the vehicle drives uphill or downhill, the vehicle may obtain the layer information thereof.

In S305, the vehicle incorporating the layer information of the vehicle in a message.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the vehicle may generate a data structure for representing the message based on a syntax standard. In some embodiments, the syntax standard may be ASN.1 or XML.

In some embodiments, after the data structure for representing the message is generated, the vehicle may add the layer information of the vehicle into the data structure.

In some embodiments, different values may be used to represent different layers of a viaduct and added into the data structure. For example, layers of a three-layer viaduct may be represented by 0, 1, 2 from bottom to up.

In some embodiments, the vehicle may encode the data structure for representing the message to a data stream based on an encoding rule.

In some embodiments, the encoding rule may be DER. The data structure may be encoded into a data stream consisting of data type, length and content. In some embodiments, the data stream may be over-the-air bits and bytes.

In some embodiments, the length of the layer information may be one byte.

In S307, the vehicle broadcasting the message through a channel which is dedicated for vehicular safety use.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, a pedestrian device may broadcast its layer information through a channel which is dedicated for vehicular safety use.

In some embodiments, a vehicle or a pedestrian device may broadcast any combination of road information, lane information or layer information through a channel which is dedicated for vehicular safety use.

From above, an electronic device mounted on a vehicle or a pedestrian device can broadcast road information, lane information or layer information through a channel which is dedicated for vehicular safety use, so that other vehicles, roadside units or pedestrian devices may receive those information which plays an important role in some safety applications.

Figure 10:
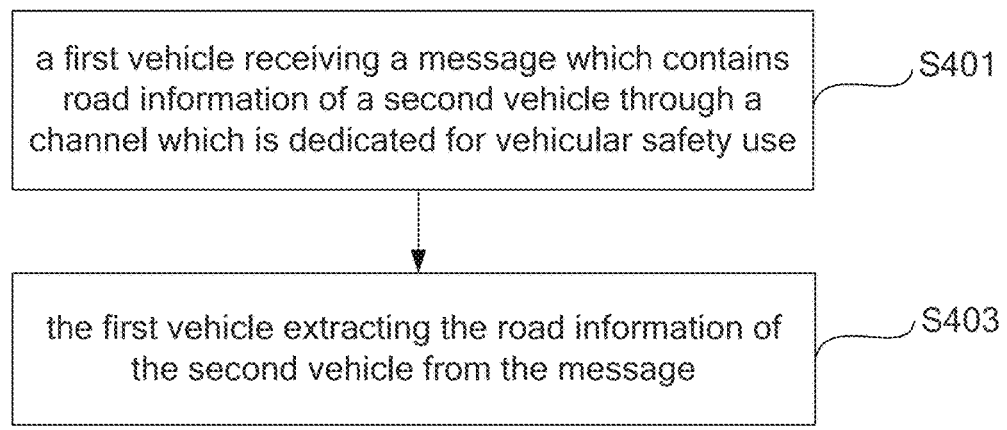
FIG. 10 illustrates a schematic flow chart of a method 400 for receiving road information through a channel which is dedicated for vehicular safety use according to some embodiments.

FIG. 10 illustrates a schematic flow chart of a method 400 for receiving road information through a channel which is dedicated for vehicular safety use according to some embodiments.

Referring to FIG. 10, in S401, a first vehicle receiving a message which contains road information of a second vehicle through a channel which is dedicated for vehicular safety use.

In some embodiments, the road information of the second vehicle may indicate on which road the second vehicle is travelling.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the message may be represented by data stream. In some embodiments, the data stream may be over-the-air bits and bytes.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In S403, the first vehicle extracting the road information of the second vehicle from the message.

In some embodiments, the data stream may be decoded into a data structure based on a decoding rule to obtain the road information of the second vehicle.

In some embodiments, the decoding rule may be DER.

In some embodiments, after obtaining the data structure, the first vehicle may obtain a value which represents the road information of the second vehicle. In some embodiments, according to predetermined corresponding relations between values and road names, the first vehicle may obtain the detailed road information of the second vehicle.

Figure 11:
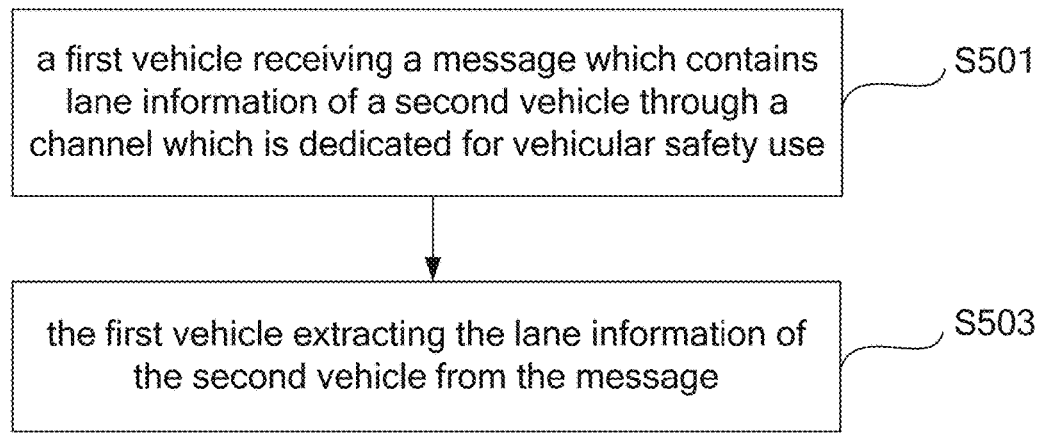
FIG. 11 illustrates a schematic flow chart of a method 500 for receiving lane information through a channel which is dedicated for vehicular safety use according to some embodiments.

FIG. 11 illustrates a schematic flow chart of a method 500 for receiving lane information through a channel which is dedicated for vehicular safety use according to some embodiments.

Referring to FIG. 11, in S501, a first vehicle receiving a message which contains lane information of a second vehicle through a channel which is dedicated for vehicular safety use.

In some embodiments, the lane information of the second vehicle may indicate on which lane the second vehicle is travelling.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the message may be represented by data stream. In some embodiments, the data stream may be over-the-air bits and bytes.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In S503, the first vehicle extracting the lane information of the second vehicle from the message.

In some embodiments, the data stream may be decoded into a data structure based on a decoding rule to obtain the lane information of the second vehicle.

In some embodiments, the decoding rule may be DER.

In some embodiments, after obtaining the data structure, the first vehicle may obtain a value which represents the lane information of the second vehicle. In some embodiments, according to predetermined corresponding relations between values and lanes, the first vehicle may obtain the detailed lane information of the second vehicle.

Figure 12:
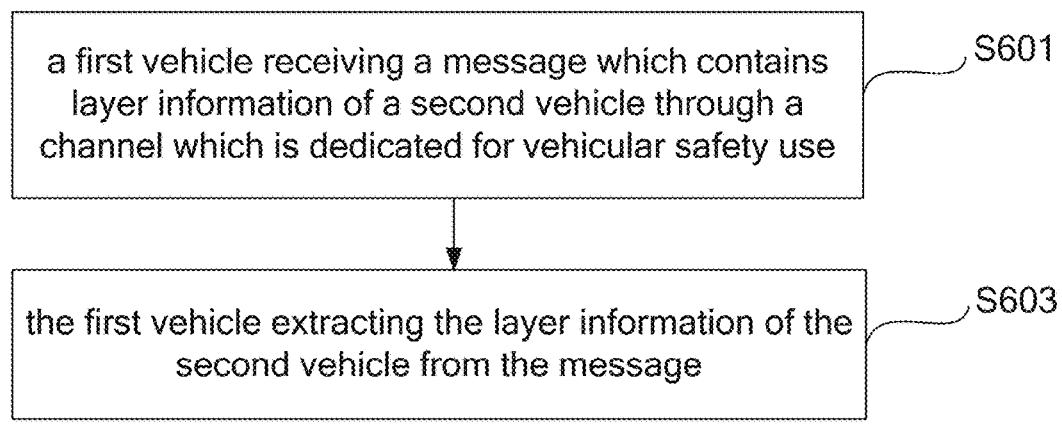
FIG. 12 illustrates a schematic flow chart of a method 600 for receiving layer information through a channel which is dedicated for vehicular safety use according to some embodiments.

FIG. 12 illustrates a schematic flow chart of a method 600 for receiving layer information through a channel which is dedicated for vehicular safety use according to some embodiments.

Referring to FIG. 12, in S601, a first vehicle receiving a message which contains layer information of a second vehicle through a channel which is dedicated for vehicular safety use.

In some embodiments, the layer information of the second vehicle may indicate on which layer of a viaduct the second vehicle is travelling.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the message may be represented by data stream. In some embodiments, the data stream may be over-the-air bits and bytes.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In S603, the first vehicle extracting the layer information of the second vehicle from the message.

In some embodiments, the data stream may be decoded into a data structure based on a decoding rule to obtain the layer information of the second vehicle.

In some embodiments, the decoding rule may be DER.

In some embodiments, after obtaining the data structure, the first vehicle may obtain a value which represents the layer information of the second vehicle. In some embodiments, according to predetermined corresponding relations between values and layers, the first vehicle may obtain the detailed layer information of the second vehicle.

In some embodiments, a pedestrian device may receive a message containing road information, lane information or layer information of a vehicle, and extract corresponding information of the vehicle from the message.

In some embodiments, an electronic device may receive a message containing any combination of road information, lane information or layer information of another electronic device, and extract corresponding information of the another electronic device from the message.

From above, an electronic device mounted on a vehicle or a pedestrian device may receive road information, lane information or layer information of another electronic device through a channel which is dedicated for vehicular safety use, which may meet requirements in some safety applications.

Figure 13:
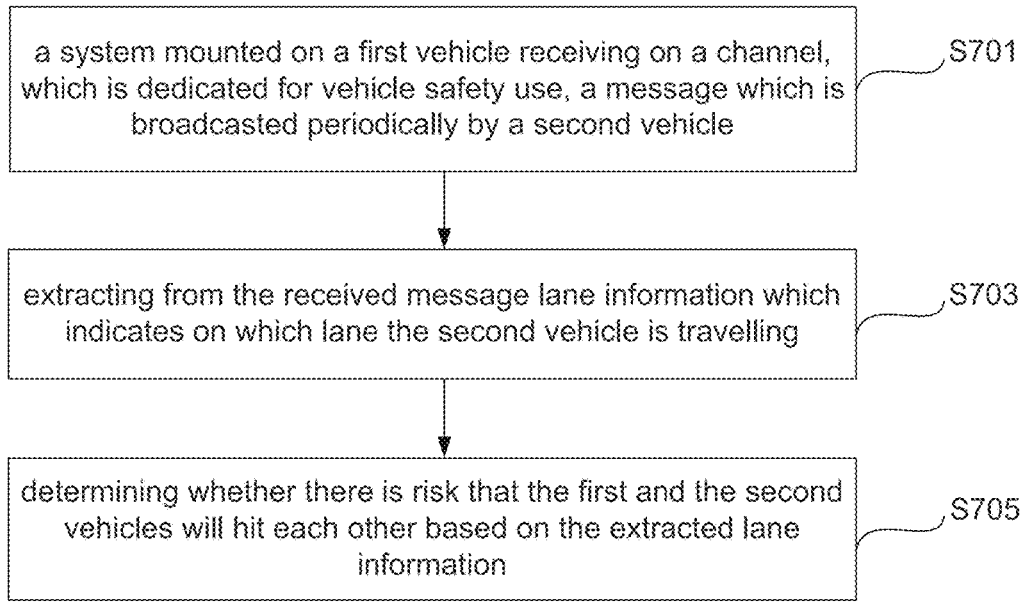
FIG. 13 illustrates a schematic flow chart of a method 700 for determining whether a collision will happen according to some embodiments.

FIG. 13 illustrates a schematic flow chart of a method 700 for determining whether a collision will happen according to some embodiments Referring to FIG. 13, in S701, a system mounted on a first vehicle receiving on a channel, which is dedicated for vehicular safety use, a message which is broadcasted periodically by a second vehicle.

In some embodiments, the message may be a vehicle safety message. In some embodiments, the message may be defined in a particular standard. For example, in America, the message may be defined in the SAE J2735 standard, such as a BSM. In European Union, the message may be defined in the ETSI TS 102 637 standard. In some embodiments, the message may be a CAM. In Japanese, the message may be defined in the ARIB standard.

In S703, extracting from the received message lane information which indicates on which lane the second vehicle is travelling.

In S705, determining whether there is risk that the first and the second vehicles will hit each other based on the extracted lane information.

In some embodiments, the method 700 may further include: extracting from the received message road information which indicates on which road the second vehicle is travelling; and determining whether there is risk that the first and the second vehicles will hit each other based on the extracted road and lane information.

In some embodiments, based on the extracted road and lane information of the second vehicle, the system may determine that the first and the second vehicles are travelling on a same road and on adjacent lanes. If the first vehicle is determined to be close to the second vehicle based on GPS data of the first and second vehicles, the system may determine that there is risk that the first and the second vehicles will hit each other and generate an alarm to mention a user.

In some embodiments, the method 700 may further include: extracting from the received message layer information which indicates on which layer of a viaduct the second vehicle is travelling; and determining whether there is risk that the first and the second vehicles will hit each other based on the extracted layer and lane information.

Figure 14:
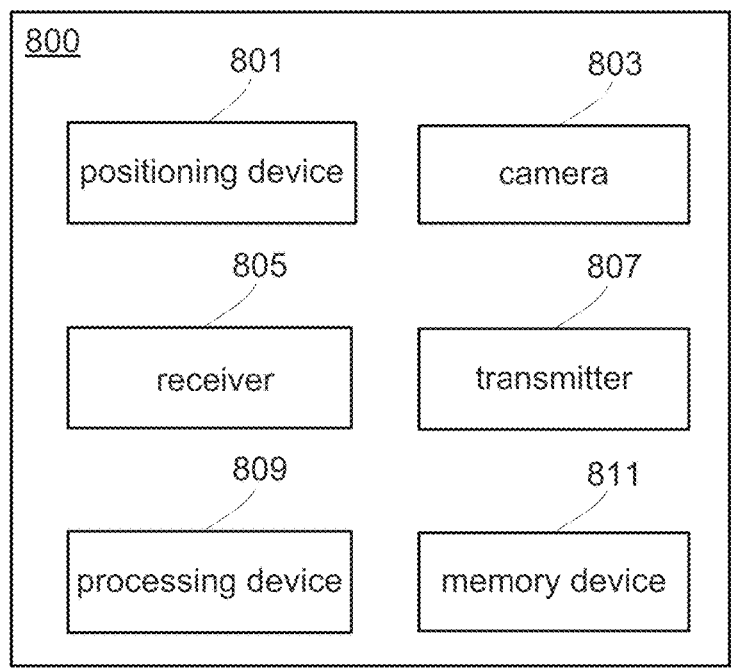
FIG. 14 illustrates a schematic block diagram of a communication system 800 mounted on a vehicle according to some embodiments.

FIG. 14 illustrates a schematic block diagram of a communication system 800 mounted on a vehicle according to some embodiments. Referring to FIG. 14, the communication system 800 includes a positioning device 801, a camera 803, a receiver 805, a transmitter 807, a processing device 809, and a memory device 811.

The positioning device 801 may be configured to obtain position information of the vehicle, for example, geographical coordinates of the communication system 800, and the heading information of the vehicle. In some embodiments, the positioning device 801 may be a GPS device. The camera 803 may be mounted on the vehicle either facing or opposite to the driving direction of the vehicle and configured to capture an image. The receiver 805 may be configured to receive messages from other vehicles or pedestrian devices. The transmitter 807 may be configured to broadcast messages.

The processing device 809 may be configured to: combine the position information and heading information of the vehicle with a map to obtain road information of the vehicle; incorporate the road information of the vehicle in a message; and control the transmitter 807 to broadcast the message through a channel which is dedicated for vehicular safety use. In some embodiments, the road information may indicate on which road the vehicle is travelling.

In some embodiments, the processing device 809 may be configured to: obtain an image captured by the camera 803; obtain lane information of the vehicle from the image based on image processing technologies; incorporate the lane information of the vehicle in a message; and control the transmitter 807 to broadcast the message through a channel which is dedicated for vehicular safety use. In some embodiments, the lane information may indicate on which lane the vehicle is travelling.

In some embodiments, the processing device 809 may be configured to: obtain vehicle data of the vehicle from sensors amounted on the vehicle; obtain layer information of the vehicle based on the vehicle data of the vehicle; incorporate the layer information of the vehicle in a message; and control the transmitter 807 to broadcast the message through a channel which is dedicated for vehicular safety use. In some embodiments, the layer information may indicate on which layer of a viaduct the vehicle is travelling.

In some embodiments, the vehicle data may be obtained from sensors mounted on the vehicle, such as a torque sensor, a wheel sensor, a sideslip sensor, a gyroscope or an acceleration transducer. In some embodiments, the vehicle data may include speed, acceleration, torque, orientation and so on.

In some embodiments, the message may be a vehicle safety message. In some embodiments, the message may be defined in a particular standard. For example, in America, the message may be defined in the SAE J2735 standard. In some embodiments, the message may be a BSM. In European Union, the message may be defined in the ETSI TS 102 637 standard. In some embodiments, the message may be a CAM. In Japanese, the message may be defined in the ARIB standard.

In some embodiments, the processing device 809 may be configured to: incorporate the road information and the lane information of the vehicle in a message; and control the transmitter 807 to broadcast the message through a channel which is dedicated for vehicular safety use.

In some embodiments, the processing device 809 may be configured to: incorporate the layer information and the lane information of the vehicle in a message; and control the transmitter 807 to broadcast the message through a channel which is dedicated for vehicular safety use.

In some embodiments, the processing device 809 may be configured to: incorporate the road information, the lane information and the layer information of the vehicle in a message; and control the transmitter 807 to broadcast the message through a channel which is dedicated for vehicular safety use.

In some embodiments, the channel may be allocated based on particular standards or policies which vary from different areas. For example, in America, the channel may be allocated by FCC, where radio frequency in a 5.9 GHz band is used. In European Union, the channel may be allocated by ETSI, where radio frequency in a 5.9 GHz band is used. In Japanese, the channel may be allocated by MIC, where radio frequency in a 5.8 GHz band or in a 700 MHz band is used.

In some embodiments, the processing device 809 may be further configured to: after a message containing road information, lane information or layer information of another vehicle is received on a channel, which is dedicated for vehicular safety use, by the receiver 805, extract the road information, the lane information or the layer information of the another vehicle from the message.

In some embodiments, the processing device 809 may be a CPU, or a MCU, or a DSP etc., or any combination thereof. The memory device 811 may store an operating system and program instructions.

In some embodiments, a communication system mounted on a pedestrian device, which is capable of broadcasting or receiving road information, lane information or layer information, may be provided.

According to one embodiment, a non-transitory computer readable medium, which contains a computer program for broadcasting information, is provided. When the computer program is executed by a processor, it will instruct the processor to: obtain lane information of an electronic device, where the lane information indicates on which lane the electronic device is travelling; and broadcast the lane information of the electronic device through a channel which is dedicated for vehicular safety use.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for broadcasting information through a channel which is dedicated for vehicular safety use, comprising:
   obtaining, with an electronic device mounted on a vehicle, both lane information of the vehicle and layer information of the vehicle, where the lane information indicates on which lane the vehicle is travelling;
   broadcasting the lane information of the vehicle through the channel; and
   broadcasting the layer information of the vehicle through the channel, where the layer information indicates on which layer of a multi-layered viaduct the vehicle is travelling.

2. The method according to claim 1, further comprising obtaining an image captured by a camera mounted on the vehicle, and obtaining the lane information of the vehicle from the image based on image processing technologies.

3. The method according to claim 1, further comprising broadcasting road information of the vehicle through the channel, where the road information indicates on which road the vehicle is travelling.

4. The method according to claim 1, further comprising determining the layer information of the vehicle based on determining whether the vehicle is driving uphill or downhill based on torque information of the vehicle.

5. The method according to claim 1, wherein the vehicle is a first vehicle, the method further comprising:
   receiving on the channel, which is dedicated for vehicular safety use, a message which is broadcasted periodically by a second vehicle;
   extracting from the received message lane information which indicates on which lane the second vehicle is travelling; and
   determining whether there is risk that the first and second vehicles will hit each other based on the extracted lane information.

6. The method according to claim 5, further comprising:
   extracting from the received message road information which indicates on which road the second vehicle is travelling; and
   determining whether there is risk that the first and second vehicles will hit each other based on the extracted road and lane information.

7. The method according to claim 5, further comprising:
   extracting from the received message layer information which indicates on which layer of the multi-layer viaduct the second vehicle is travelling; and
   determining whether there is risk that the first and second vehicles will hit each other based on the extracted layer and lane information.

8. The method of claim 1, further comprising:
   receiving a message which contains lane information of a second vehicle through the channel, where the lane information of the second vehicle indicates on which lane the second vehicle is travelling; and
   extracting the lane information of the second vehicle from the message.

9. The method of claim 1, further comprising:
   receiving a message which contains lane information of a second electronic device through the channel, where the lane information of the second electronic device indicates on which lane the second electronic device is travelling; and
   extracting the lane information of the second electronic device from the message.

10. An electronic device mounted on a vehicle, comprising a transmitter and a processing device configured to:
    obtain both lane information and layer information of the vehicle, where the lane information indicates on which lane the vehicle is travelling;
    control the transmitter to broadcast the lane information of the vehicle through a channel which is dedicated for vehicular safety use; and
    control the transmitter to broadcast the layer information of the vehicle through the channel, where the layer information indicates on which layer of a multi-layered viaduct the vehicle is travelling.

11. The electronic device according to claim 10, wherein the processing device is configured to obtain an image captured by a camera mounted on the vehicle, and obtain the lane information of the vehicle from the image based on image processing technologies.

12. The electronic device according to claim 10, wherein the processing device is further configured to broadcast road information of the vehicle through the channel, where the road information indicates on which road the vehicle is travelling.

13. The electronic device according to claim 10, wherein the processing device is further configured to broadcast layer information of the vehicle through the channel, where the layer information indicates on which layer of the multi-layer viaduct the vehicle is travelling.

14. An electronic device mounted on a first vehicle, comprising a receiver and a processing device configured to:
    after a message, which is broadcasted periodically by a second vehicle, is received on a channel by the receiver, extract from the received message road information which indicates on which road the second vehicle is travelling, lane information which indicates on which lane the second vehicle is travelling, and layer information which indicates on which layer of a multi-layer viaduct the second vehicle is travelling, the channel being dedicated for vehicular safety use; and
    determine whether there is risk that the first and second vehicles will hit each other based on the extracted road information, lane information, and layer information.

15. The electronic device according to claim 14, wherein the processing device is further configured to:
    determining that the first vehicle and the second vehicle do not affect each other responsive to the extracted layer information of the second vehicle being different than layer information for the first vehicle, even if both road information and lane information of the first vehicle are the same as the road information and the lane information of the second vehicle.

* * * * *

UNITED STATES PATENT AND TRADEMARK OFFICE
CERTIFICATE OF CORRECTION

PATENT NO. : 10,325,498 B2
APPLICATION NO. : 15/315356
DATED : June 18, 2019
INVENTOR(S) : Guoxia Zhang et al.

Page 1 of 1

It is certified that error appears in the above-identified patent and that said Letters Patent is hereby corrected as shown below:

On the Title Page

Item (73), correct "Hartman International Industries, Incorporated" to read "Harman International Industries, Incorporated".

Signed and Sealed this
Sixth Day of August, 2019

Andrei Iancu
*Director of the United States Patent and Trademark Office*